(12) United States Patent
Toyoshima et al.

(10) Patent No.: US 9,004,542 B2
(45) Date of Patent: Apr. 14, 2015

(54) PIPE FASTENING STRUCTURE

(75) Inventors: Hideki Toyoshima, Kuki (JP); Kazumi Miura, Tochigi (JP); Masakazu Nomura, Koga (JP)

(73) Assignee: Sanoh Kogyo Kabushiki Kaisha, Tokyo-To (JP)

( * ) Notice: Subject to any disclaimer, the term of this patent is extended or adjusted under 35 U.S.C. 154(b) by 258 days.

(21) Appl. No.: 12/948,860

(22) Filed: Nov. 18, 2010

(65) Prior Publication Data
US 2011/0121563 A1    May 26, 2011

(30) Foreign Application Priority Data

Nov. 20, 2009 (JP) ................................ 2009-265030

(51) Int. Cl.
*F16L 27/04* (2006.01)
*F16L 19/025* (2006.01)
*F02M 55/00* (2006.01)
*F16L 19/02* (2006.01)

(52) U.S. Cl.
CPC ............ *F16L 19/025* (2013.01); *F02M 55/005* (2013.01); *F16L 19/0225* (2013.01)

(58) Field of Classification Search
CPC .. F02M 55/005; F16L 19/0225; F16L 19/025
USPC .................. 285/261–271, 353–354, 384–389
See application file for complete search history.

(56) References Cited

U.S. PATENT DOCUMENTS

| 797,418 | A | * | 8/1905 | Everson | 285/17 |
| 954,496 | A | * | 4/1910 | Barron | 285/148.4 |
| 1,076,921 | A | * | 10/1913 | Stafford | 285/271 |
| 1,187,642 | A | * | 6/1916 | Milz | 285/261 |
| 1,695,263 | A | * | 12/1928 | Jacques | 138/120 |
| 1,825,825 | A | * | 10/1931 | Schulder | 285/263 |
| 1,883,279 | A | * | 10/1932 | Zerk | 285/9.2 |
| 1,929,854 | A | * | 10/1933 | Rogers | 285/148.2 |
| 2,034,808 | A | * | 3/1936 | Graham | 285/288.1 |
| 2,085,854 | A | * | 7/1937 | Hathaway et al. | 239/567 |
| 2,457,384 | A | * | 12/1948 | Krenz | 285/261 |
| 3,273,917 | A | | 9/1966 | Chakroff | |
| 3,292,955 | A | * | 12/1966 | Luther | 285/261 |
| 3,332,709 | A | * | 7/1967 | Kowalski | 285/23 |

(Continued)

FOREIGN PATENT DOCUMENTS

| DE | 1 989 249 | 7/1968 |
| DE | 44 07 306 C1 | 9/1995 |

(Continued)

OTHER PUBLICATIONS

Patent Abstracts of Japan 10-122454 published May 15, 1998.

(Continued)

*Primary Examiner* — Michael P Ferguson
*Assistant Examiner* — Jay R Ripley
(74) *Attorney, Agent, or Firm* — Ladas & Parry LLP

(57) ABSTRACT

A pipe fastening structure includes an end member attached to an end part of a metal pipe, and a nut for fastening the end member attached to the metal pipe to a counterpart. In the pipe fastening structure, the end member has a first spherical part to be brought into contact with a sealing surface of the counterpart, a second spherical part formed integrally with the first spherical part so as to be in contact with a sliding surface formed in the nut, and a neck continuous with the second spherical part and having the shape of a straight pipe.

14 Claims, 12 Drawing Sheets

(56) References Cited

U.S. PATENT DOCUMENTS

| | | | | |
|---|---|---|---|---|
| 3,454,288 | A | * | 7/1969 | Mancusi, Jr. ............... 285/98 |
| 3,572,775 | A | * | 3/1971 | Bloom et al. ............ 285/288.7 |
| 3,746,372 | A | * | 7/1973 | Hynes et al. ............... 285/95 |
| 3,791,026 | A | * | 2/1974 | Dufrene et al. ............ 228/154 |
| 3,891,246 | A | * | 6/1975 | Hopper ..................... 285/110 |
| 4,182,950 | A | * | 1/1980 | Boros ..................... 219/137 R |
| 5,082,070 | A | * | 1/1992 | Obermeier et al. ........ 175/403 |
| 5,290,075 | A | * | 3/1994 | Allread ..................... 285/261 |
| 5,975,588 | A | * | 11/1999 | Hesseln et al. ............... 285/89 |
| 6,663,146 | B1 | * | 12/2003 | Sakai et al. ............... 285/353 |
| 6,736,431 | B2 | * | 5/2004 | Jung et al. ............. 285/288.1 |
| 6,746,056 | B2 | * | 6/2004 | Palmer ..................... 285/261 |
| 6,859,956 | B2 | * | 3/2005 | Mantyla et al. ............... 4/679 |
| 7,461,636 | B2 | * | 12/2008 | Ricco et al. ............... 123/456 |
| 7,735,473 | B2 | * | 6/2010 | Kato et al. ............... 123/468 |
| 2006/0284421 | A1 | * | 12/2006 | Fonville et al. ............ 285/386 |
| 2008/0042434 | A1 | * | 2/2008 | Kenny ..................... 285/354 |

FOREIGN PATENT DOCUMENTS

| | | | |
|---|---|---|---|
| DE | 19511063 | A1 | 11/1995 |
| DE | 295 21 617 | U1 | 11/1997 |
| DE | 10 2007 046 203 | A1 | 5/2008 |
| DE | 10 2010 004 918 | A1 | 8/2010 |
| GB | 2 350 410 | A | 11/2000 |
| JP | 52-122720 | | 10/1977 |
| JP | 10-122454 | | 5/1998 |
| JP | 2000-227183 | | 8/2000 |
| JP | 2007-309232 | A | 11/2007 |
| JP | 2008-133817 | A | 6/2008 |
| JP | 2009-52452 | A | 3/2009 |
| JP | 2009-144668 | | 7/2009 |
| WO | WO 2007105659 | A1 * | 9/2007 |

OTHER PUBLICATIONS

Patent Abstracts of Japan 2000-227183 published Aug. 15, 2000.
Patent Abstracts of Japan 2009-144668 published Jul. 2, 2009.
European Search Report from in respect of counterpart Application No. EP 10191796.1, Mar. 24, 2011.
Office Action issued on May 18, 2012 for Japanese Application No. 2009-265030.
Espacenet English abstract of JP 2008-133817 A.
Espacenet English abstract of JP 2009-52452 A.
Espacenet English abstract of JP 2007-309232 A.
Office Action dated May 16, 2013 for Application No. CN 201010566759.8 with English translation.
Espacenet English abstract of DE 19511063 A1, Dec. 5, 2012.
Office Action dated Nov. 29, 2012 for Application No. EP 10 191 796.1-1523.
Office Action dated Apr. 22, 2014 for Application No. CN 201010566759.8 with English translation.

* cited by examiner

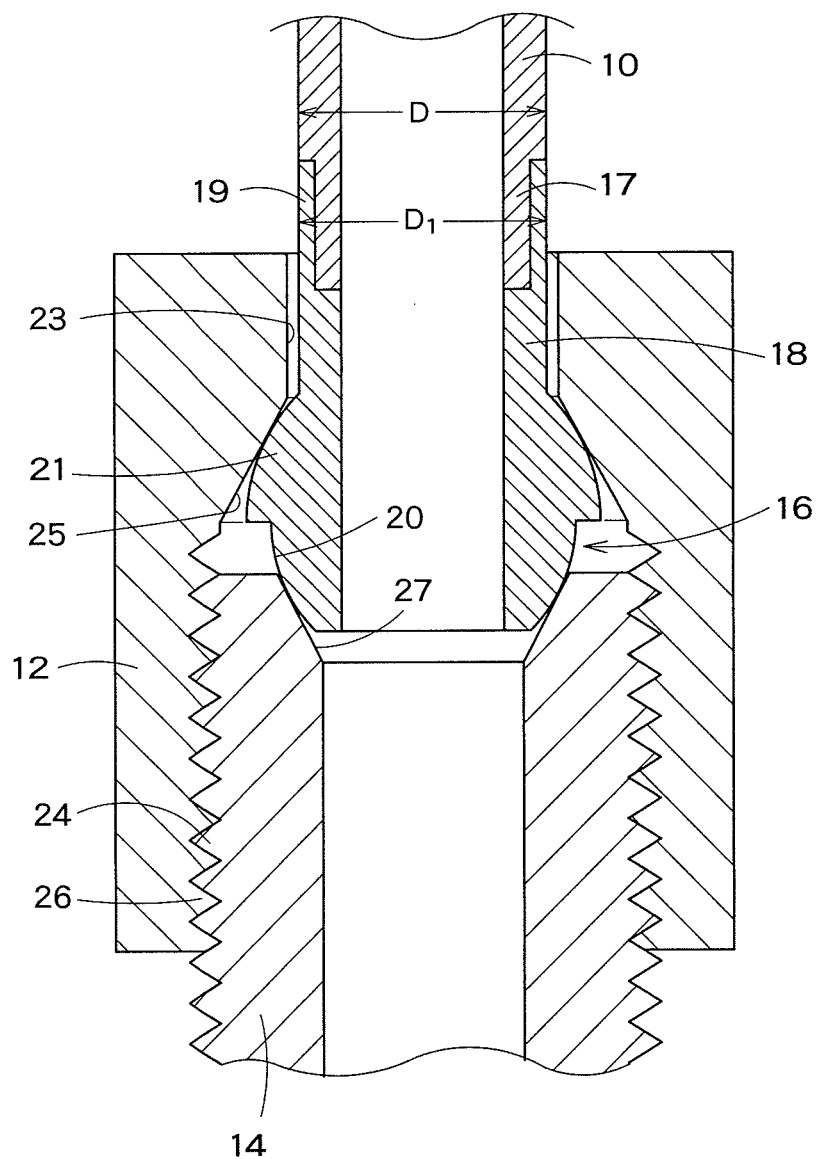
F I G. 1

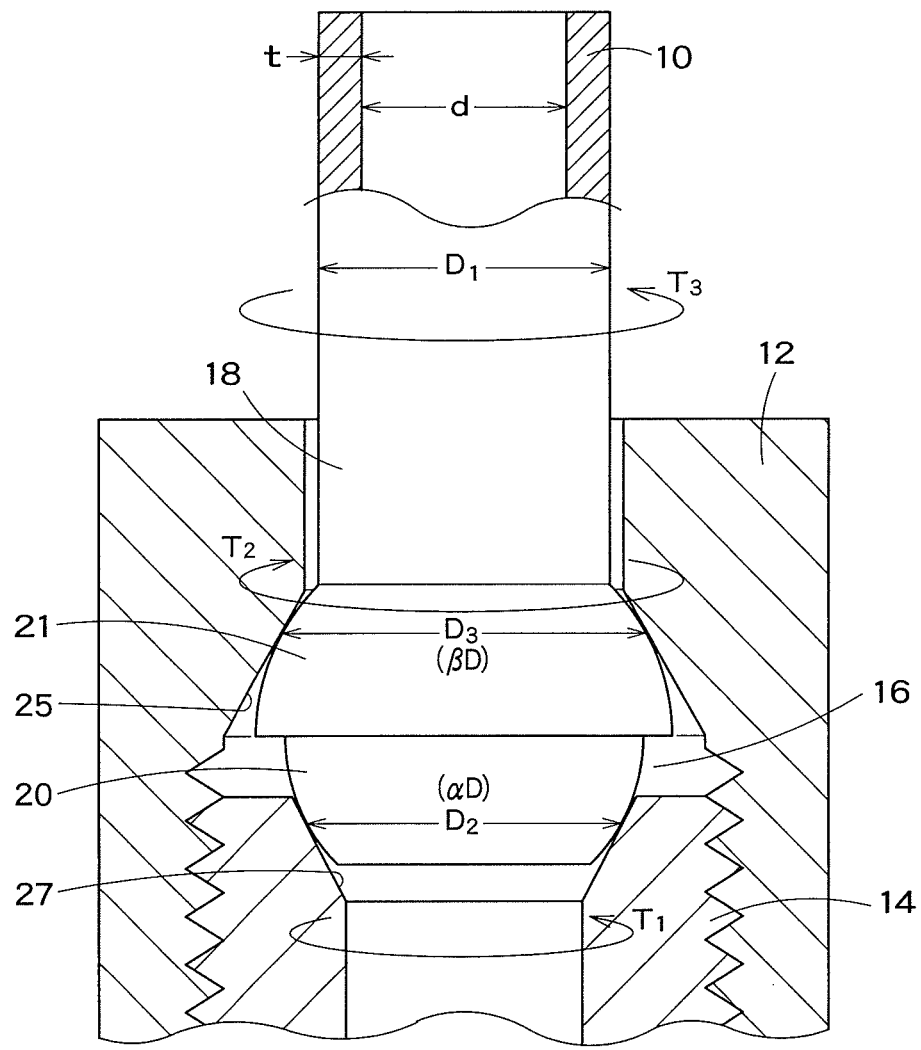
F I G. 2

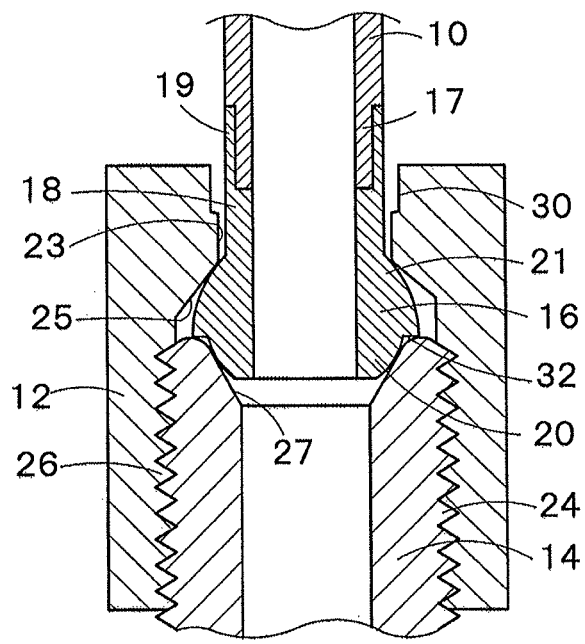
F I G. 14
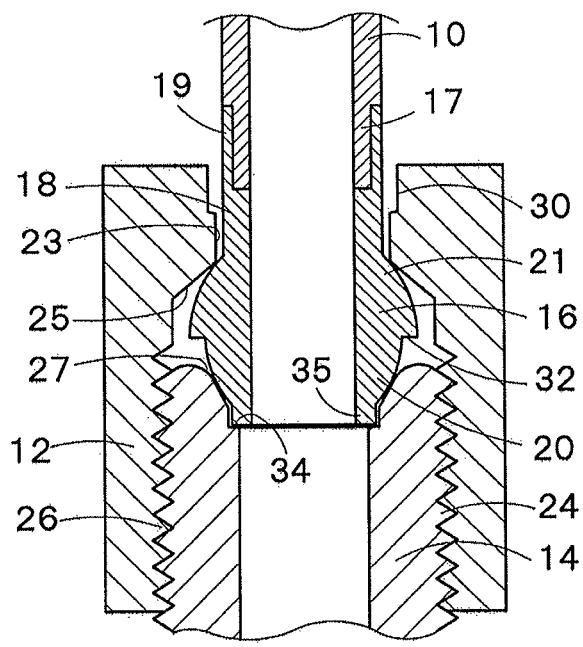
F I G. 15

PIPE FASTENING STRUCTURE

BACKGROUND OF THE INVENTION

1. Field of the Invention

The present invention relates to a pipe fastening structure for use in a fuel line on an internal combustion engine, such as a diesel or a gasoline engine. More particularly, the present invention relates to a pipe fastening structure for fastening a spherical end of an end member attached to an end part of a metal pipe to a counterpart with a nut.

2. Description of the Related Art

A fuel line on an internal combustion engine, such as a diesel or a gasoline engine, includes a metal pipe having a spherical end for carrying high-pressure fuel. The spherical end of the metal pipe is fastened to a counterpart on the engine by a pipe fastening structure including a nut for fastening the spherical end to the counterpart on the engine. Fuel leakage can be surely prevented by pressing the spherical end of the metal pipe against a seat formed in the counterpart on the engine by the nut of the pipe fastening structure. Thus, the pipe fastening structure has been widely used in high-pressure fuel lines.

For example, pipe fastening structures disclosed in Patent documents 1, 2 and 3 are representative prior art pipe fastening structures.

Generally, each of the prior art pipe fastening structures includes a sleeve (or a washer) placed between a nut and a spherical end.

The sleeve is effective in applying high pressure to the spherical end to press the spherical end against the seat of a counterpart. When the sleeve is thus used, local pressure reduction can be avoided and stable sealing can be achieved even if the nut is fastened with the respective axes of the spherical end and the counterpart are slightly misaligned because the respective axes of the spherical end and the sleeve are aligned.

However, the number of the component parts of the pipe fastening structure increases, the nut becomes necessarily large and the weight of the pipe fastening structure increases necessarily when the sleeve is used.

Therefore, studies have been made to omit the sleeve and to fasten a metal pipe to a counterpart only with a nut and such pipe fastening structures have been practically used in recent years.

Patent document 1: JP-A H10-122454
Patent document 2: JP-A 2000-227183
Patent document 3: JP-A 2009-144668

SUMMARY OF THE INVENTION

It is known that the following problems arise if the sleeve is omitted and the spherical end is fastened directly to the counterpart with the nut.

It is the most significant problem that fastening toque applied to the nut is liable to act directly on the spherical end to turn the metal pipe together with the nut, that is, the turning nut is liable to drag the metal pipe, when the sleeve is omitted. If the metal pipe turns together with the nut, the sealing surface is galled and damaged due to intense friction between the spherical end and the sealing surface because the spherical end of the metal pipe pressed strongly against the sealing surface of the counterpart slides relative to the sealing surface, and fuel leakage results.

If the nut and the spherical end seize due to abrasive damage to the contact surface of the nut by intense friction between the nut and the spherical end, the nut cannot be unfastened, and the connection of the metal pipe to and the disconnection of the metal pipe from the counterpart cannot be repeated.

Such a problem arises conspicuously when stainless steel fastening parts are used. Since stainless steel parts are coated with a chromium oxide film, stainless steel parts are more frictional than steel parts and hence stainless steel parts are liable to turn together. A metal pipe needs to be fastened to a counterpart by a predetermined axial force so that the joint of the metal pipe and the counterpart may withstand high injection pressure for high-pressure injection. A torque higher than that needed to fasten steel parts by a predetermined axial force is needed to fasten stainless steel parts by the predetermined axial force. Therefore, stainless steel parts are liable to be dragged for turning. Since the thermal conductivity of stainless steels is lower than that of steel, heat is transferred at a low transfer rate in stainless steel parts, stainless steel parts are liable to cause seizure and sealing surfaces and sliding surfaces are liable to be damaged. The coefficient of thermal expansion of stainless steels is high as compared with that of steels, the thermal expansion of stainless steel parts caused by frictional heat increases pressure acting on contact surfaces and hence the contact surfaces are liable to be damaged.

Steels have a problem in resistance to the corrosive action of deteriorated gasoline and alcohol fuel which contains moisture easily. Therefore, it is a strong request to use stainless steel parts instead of steel parts to cope with the recent trend to use biofuel.

Accordingly, it is an object of the present invention to solve the problems in the prior art and to provide a pipe fastening structure capable of avoiding the turning of an end part of a metal pipe together with a nut relative to a counterpart to which the metal pipe is to be fastened when a torque necessary to produce a desired axial force is exerted on the nut and of preventing damaging a sealing surface or a sliding surface.

Means for Solving the Problem

The present invention has been made on the basis of knowledge obtained through earnest studies made by the inventors of the present invention.

A pipe fastening structure according to the present invention includes: an end member attached to an end part of a metal pipe; and a nut for fastening the end member attached to the metal pipe to a counterpart; wherein the end member has a first spherical part to be brought into contact with a sealing surface of the counterpart, a second spherical part formed integrally with the first spherical part so as to be in contact with a sliding surface formed in the nut, and a neck continuous with the second spherical part and having the shape of a straight pipe, the outside diameter $D_1$ of the neck is approximately equal to the outside diameter D of the metal pipe, the respective centers of spheres respectively defining the first and the second spherical parts are on the axis of the neck, and the ratio $\alpha/\beta$, where $\alpha=D_2/D$, $\beta=D_3/D$, D is the outside diameter of the metal pipe, $D_2$ is a diameter of a contact circle on the first spherical part in contact with the sealing surface and $D_3$ is a diameter of a contact circle on the second spherical part in contact with the sliding surface of the nut, meets an expression:

$$1.0 \geq \alpha/\beta \geq 0.80$$

A reduced part having an inside diameter smaller than that of an outer part of the nut is formed in the inside surface of a part of the nut near the outer end of the nut.

A shoulder that comes into contact with the outer end of the counterpart defining the open end of the sealing surface of the counterpart is formed at the boundary between the first and the second spherical part.

A second shoulder with which an outer end of the first spherical part is brought into contact is formed in an open end part of the sealing surface of the counterpart.

The inside surface of an end part of the first spherical part is protruded inward to form a thick end.

The end member is welded or brazed to an end part of the metal pipe, and the outside surface of the joint of the end member, and metal pipe is flush with the outside surface of the metal pipe.

The end member is formed by subjecting an end part of the metal pipe to press working.

The metal pipe, the nut and the counterpart are made of stainless steels, respectively.

The respective centers of spheres respectively defining the first and the second spherical parts are at the same point on the axis of the neck.

The sliding surface of the nut has a hardness higher than that of the surface of the second spherical part.

The sliding surface of the nut and the sealing surface of the counterpart are coated with oil.

The respective centers of spheres respectively defining the first and the second spherical parts are at the same point on the axis of the neck.

The diameter of the sphere defining the first spherical part is smaller than that of the sphere defining the second spherical part.

The metal pipe and the end member are joined such that a joining part of the metal pipe and a joining part of the end member overlap each other, the joining part of the metal pipe is fitted in the joining part of the end member, the outside surface of the metal pipe is flush with the outside surface of the joining part of the end member, and the inside surface of the joining part of the metal pipe is flush with the inside surface of the end member.

The metal pipe and the end member are joined together such that the respective joining part of the metal pipe and the end member overlap each other, the joining part of the end member is fitted in the joining part of the metal pipe, the outside surface of the joining part of the metal pipe is flush with the outside surface of the end member, and the inside surface of the metal pipe is flush with the inside surface of the joining part of the end member.

According to the present invention, the end part of the metal pipe and the nut do not turn together relative to the counterpart even if a torque necessary for producing a desired axial force is applied to the nut, so that damage to the sealing surface and the sliding surface can be prevented.

BRIEF DESCRIPTION OF THE DRAWINGS

FIG. 1 is a longitudinal sectional view of a pipe fastening structure in a first embodiment according to the present invention;

FIG. 2 is a longitudinal sectional view of the pipe fastening structure shown in FIG. 1, indicating dimensions of parts of the pipe fastening structure;

FIG. 14 is a longitudinal sectional view of a pipe fastening structure according to another embodiment of the present invention.

FIG. 15 is a longitudinal sectional view of a pipe fastening structure according to another embodiment of the present invention.

DESCRIPTION OF THE PREFERRED EMBODIMENTS

Figure 3:
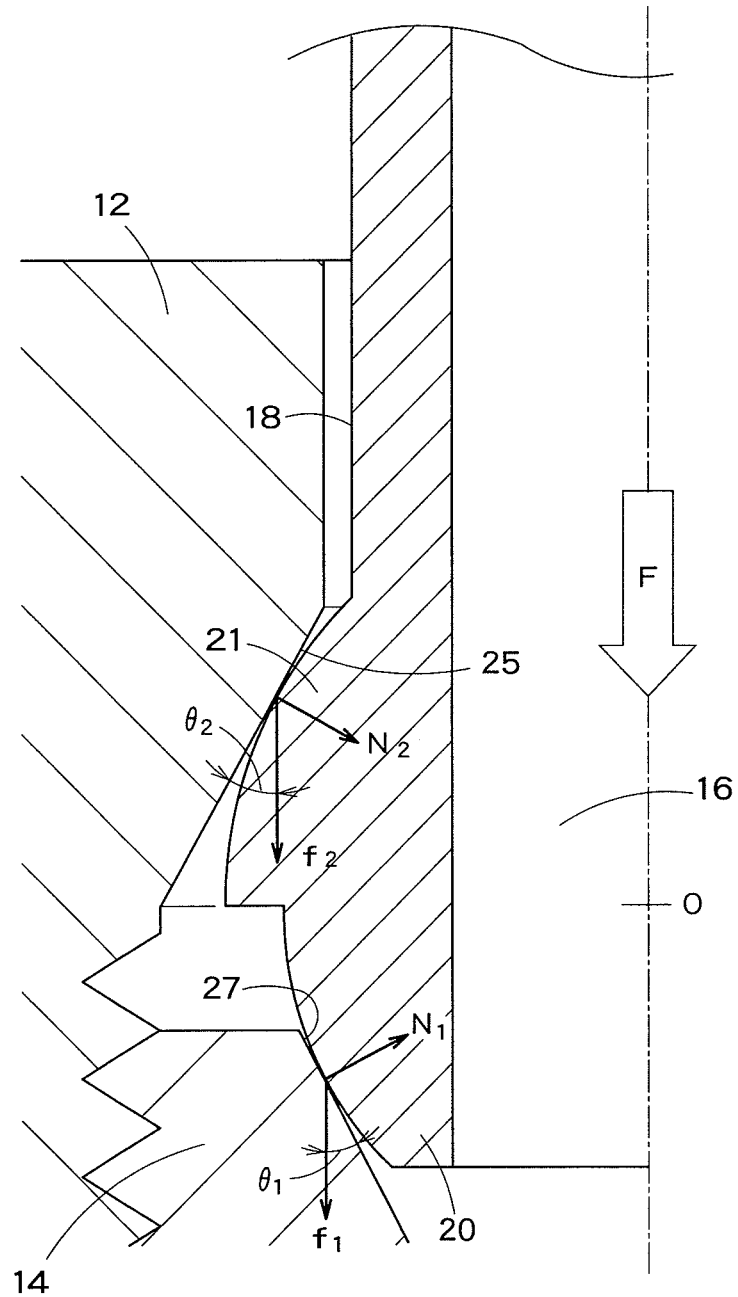
FIG. 3 is a half sectional view of the pipe fastening structure shown in FIG. 1, indicating forces respectively acting on parts of the pipe fastening structure.

Pipe fastening structures in preferred embodiments according to the present invention will be described with reference to the accompanying drawings.

First Embodiment

Referring to FIG. 1 showing a pipe fastening structure in a first embodiment according to the present invention in a longitudinal sectional view, there are shown a metal pipe 10, a nut 12, and a counterpart 14 to which the metal pipe 10 is to be fastened. The pipe fastening structure includes an end member 16 attached to an end part of the metal pipe 10, and the nut 12 for fastening the end member 16 to the counterpart 14. In this embodiment, the counterpart 14 is a pipe joint. The end member 16 having spherical parts is attached to the end part of the metal pipe 10. The end member 16 is pressed directly against the counterpart 14 with the nut 12. This pipe fastening structure differs from the prior art pipe connector in that any part such as a sleeve or a washer, is not placed between the nut 12 and the end member 16.

A joining part 17 is formed in an end part of the metal pipe 10. The end member 16 has a generally spherical bulged part having a first spherical part 20 and a second spherical part 21, and a neck 18 having the shape of a straight pipe and extending from the bulged part. The respective centers of spheres respectively defining the first spherical part 20 and the second spherical part 21 are on the axis of the neck 18.

A joining part 19 is formed in the neck 18. The joining part 17 of the metal pipe 10 is fitted in the bore of the joining part 19. Thus, the joining part 19 surrounds the joining part 17 and is welded or brazed to the joining part 17. The outside diameter $D_1$ of the neck 18 is equal to the outside diameter D of the metal pipe 10 or substantially equal to the outside diameter D of the metal tube 10 with an error within a tolerance. The outside surface of the neck 18 is flush with that of the metal pipe 10.

Preferably, the outside surface of the metal pipe 10 is flush with that of the joining part 19, and the inside surface of the joining part 17 of the metal pipe 10 is flush with the inside surface of the end member 16.

A through hole 23 is formed in the end wall of the nut 12. The diameter of the through hole 23 is slightly greater than the outside diameter D of the metal pipe 10. The neck 18 of the end member 16 is extended loosely through the through hole 23. A taper surface tapering toward the through hole 23 and a internal thread 24 are formed in the inside surface of the nut 12. The taper surface serves as a sliding surface 25 to be brought into contact with the second spherical part 21 of the end member 16.

An external thread 26 capable of mating with the internal thread 24 of the nut 12 is formed in the outside surface of a joining part of the counterpart 14. A tapered sealing surface 27 is formed in the end part of the counterpart 14. The first spherical part 20 of the end member 16 is brought into contact with the sealing surface 27.

FIG. 2 is a longitudinal sectional view of the pipe fastening structure shown in FIG. 1, indicating dimensions of parts of the pipe fastening structure, and forces that act on parts of the pipe fastening structure when the nut 12 is fastened.

Referring to FIG. 2, the metal pipe 10 has the outside diameter D, an inside diameter d and a wall thickness t.

A contact circle on the first spherical part 20 in contact with the sealing surface 27 has a diameter $D_2$, and a contact circle on the second spherical part 21 in contact with the sliding surface 25 has a diameter $D_3$. The first spherical part 20 and the second spherical part 21 are defined by spheres respectively having different diameters and having the same centers O as shown in FIG. 3. The radius of the sphere defining the second spherical part 21 is greater than that of the sphere defining the first spherical part 20. The centers O of the spheres respectively defining the first spherical part 20 and the second spherical part 21 are not necessarily at the same point on the axis of the neck 18.

In the tube fastening structure, the ratio $\alpha=D_2/D$, where $D_2$ is the diameter of the contact circle on the first spherical part 20 in contact with the sealing surface 27 and D is the outside diameter of the metal pipe 10, and the ratio $\beta=D_3/D$, where $D_3$ is the diameter of the contact circle on the second spherical part 21 in contact with the sliding surface 25 meet an expression:

$$D_2=\alpha D$$

$$D_3=\beta D$$

Forces act on parts as shown in FIG. 2 when the nut 12 is fastened

Normally, the end member 16 does not turn and is pressed against the counterpart 14 when the nut 12 is fastened because friction between the sealing surface 27 and the first spherical part 20 of the end member 16 pressed against the sealing surface 27 exerts a frictional torque $T_1$ on the first spherical part 20 to restrain the end member 16 from turning.

Suppose that a fastening torque $T_2$ is exerted on the nut 12 for fastening and the metal pipe 10 is fixed by a stay or the line not shown. When the nut 12 turned by the fastening torque $T_2$ tries to drag the end member 16, torsion acts on the metal pipe 10. Then, the torsional rigidity of the metal pipe 10 produces torsional countertorque $T_3$.

The following expression needs to be satisfied to avoid the turning of the end member 16 together with the nut 12 when the nut 12 is turned for fastening.

$$T_1 \geq T_2 - T_3 \quad (1)$$

Therefore, in considering means for preventing the end member from being dragged for turning by the nut when the nut is fastened, it is possible to specify conditions for designing the pipe fastening structure having the nut that does not drag the pipe for turning and meeting Expression (1) if the relation between the diameter $\alpha D$ of the contact circle on the first spherical part 20 in contact with the sealing surface 27 and the diameter $\beta D$ of a contact circle on the second spherical part 21 in contact with the sliding surface 25 is known. A pipe fastening structure that does not drag a metal pipe for turning will be specified.

FIG. 3 is a half sectional view showing components of forces that act on parts of the pipe fastening structure when the nut 12 is fastened.

In FIG. 3, F is an axial force that presses the end member 16 against the sealing surface 27 of the counterpart 14 when the nut 12 is fastened. When the axial force F acts on the end member 16, an axial force $f_1$ acts on a unit length of the contact circle on the first spherical part 20 in contact with the sealing surface 27, and an axial force $f_2$ acts on a unit length of the contact circle on the second spherical part 21 in contact with the sliding surface 25 of the nut 12. The axial forces $f_1$ and $f_2$ are expressed by:

$$f_1 = F/\pi \alpha D$$

$$f_2 = F/\pi \beta D$$

Suppose that a normal component force acting on a point on the first spherical part 20 in contact with the sealing surface 27 is $N_1$, the angle between a tangent at the contact point on the first spherical part 20 in contact with the sealing surface 27 and the axis is $\theta_1$, a normal component force acting on a point on the second spherical part 21 in contact with the sliding surface 25 is $N_2$, the angle between a tangent at the contact point on the second spherical part 21 in contact with the sliding surface 25 and the axis is $\theta_2$.

Then, the normal component forces $N_1$ and $N_2$ are expressed by:

$$N_1 = f_1 \cdot \sin \theta_1$$

$$N_2 = f_2 \cdot \sin \theta_2$$

Suppose that the friction coefficient between the sealing surface 27 and the first spherical part 20 and between the sliding surface 25 and the second spherical part 21 is $\mu$, friction forces acting on unit lengths of the contact circles respectively on the first spherical part 20 and the second spherical part 21 in contact with the sealing surface 27 and the sliding surface 25, respectively, are $\mu N_1$ and $\mu N_2$. Torque is (friction force)×(circumference)×(radius). Therefore, torques respectively exerted on the first spherical part 20 and the second spherical part 21 are expressed by the following expressions.

$$T_1 = \mu N_1 \cdot \pi \alpha D \cdot \alpha D/2 = (\mu F \sin \theta_1 / \pi \alpha D) \cdot \pi \alpha D \cdot (\alpha D/2) = (\mu F \alpha D/2) \cdot \sin \theta_1$$

$$T_2 = \mu N_2 \cdot \pi \beta D \cdot \beta D/2 = (\mu F \beta D/2) \cdot \sin \theta_2$$

Torsional rigidity of the metal pipe 10 having the inside diameter d and the outside diameter D is expressed by the following expressions.

$$\tau_{max} = T_3/Z_p$$

$$T_3 = \tau_{max} \cdot Z_p = \tau_{max} \cdot \pi(D^4 - d^4)/16D = \tau_{max} \cdot \pi D^3 (1-\gamma^4)/16$$

In those expressions, $Z_p$ is the torsion section modulus. Generally, the torsion section modulus $Z_p$ of the metal pipe 10 having the outside diameter D and the inside diameter d is expressed by: $Z_p = \pi(D^4 - d^4)/16D$. Generally $\tau = T_3/Z_p$, where $\tau$ is shearing stress. It is supposed that the maximum shearing stress $\tau_{max}$ is the maximum value of the shearing stress $\tau$.

Expression (2) is obtained by substituting those expressions into Expression (1).

$$(\mu F \alpha D/2) \cdot \sin \theta_1 \geq (\mu F \beta D/2) \cdot \sin \theta_2 - \tau_{max} \pi D^3 (1-\gamma^4)/16 \quad (2)$$

The left side of Expression (2) represents frictional torque $T_1$, the first member of the right side represents fastening torque $T_2$, and the second member of the right side represents torsional countertorque $T_3$ produced by the torsional rigidity of the metal pipe 10.

The frictional torque $T_1$ is proportional to the force F. The fastening torque $T_2$ is proportional to the force F, and the torsional countertorque $T_3$ produced by the torsional rigidity is a constant dependent on the shape and the material of the metal pipe 10.

The metal pipe 10 having characteristics perfectly meeting the condition expressed by Expression (2) can surely avoid being dragged for turning when the nut 12 fastens the end member 16 to the counterpart 14.

The relation expressed by Expression (2) will be shown in FIGS. 4 to 7 to determine a pipe fastening structure meeting the relation expressed by Expression (2).

As mentioned above, $\alpha = D_2/D$. Practically, the value of the ratio $\alpha$ is in the range of 0.9 to 1.1 as obvious from FIG. 2. It is supposed that the ratio $\alpha$ is approximately equal to 1.

FIGS. 4 to 7 show results of analysis of variations of the frictional torque $T_1$, and the difference between the fastening torque $T_2$ and the torsional countertorque $T_3$ ($T_2 - T_3$) for metal pipes 10 having different outside diameters D and different wall thicknesses t.

Since $t = (D-d)/2$, the ratio $\gamma = d/D$ is determined when the wall thickness t and the outside diameter D are specified.

The friction coefficient $\mu$ is a constant dependent on the materials of the metal pipe and the nut.

It is supposed that the metal pipe 10 and the counterpart 14 are made of stainless steels, respectively. According to HS, the friction constant $\mu = 0.64$ with friction between parts respectively made of SUS304 and SUS630. According to HS, the respective allowable tensile stresses of SUS304 and SUS630 are 108 MPa. Therefore, the maximum shearing stress $\tau_{max} = 108 \text{ MPa}/3^{1/2} = 62.35 \text{ MPa}$.

Typically, the angle $\theta_1 = 30°$ and the angle $\theta_2 = 45°$. Even if the angle $\theta_1$ is a variable around 30° and the angle $\theta_2$ is a variable around 45°, there is not significant difference. Thus, it is proper to suppose that $\theta_1 = 30°$ and $\theta_2 = 45°$.

Figure 4:
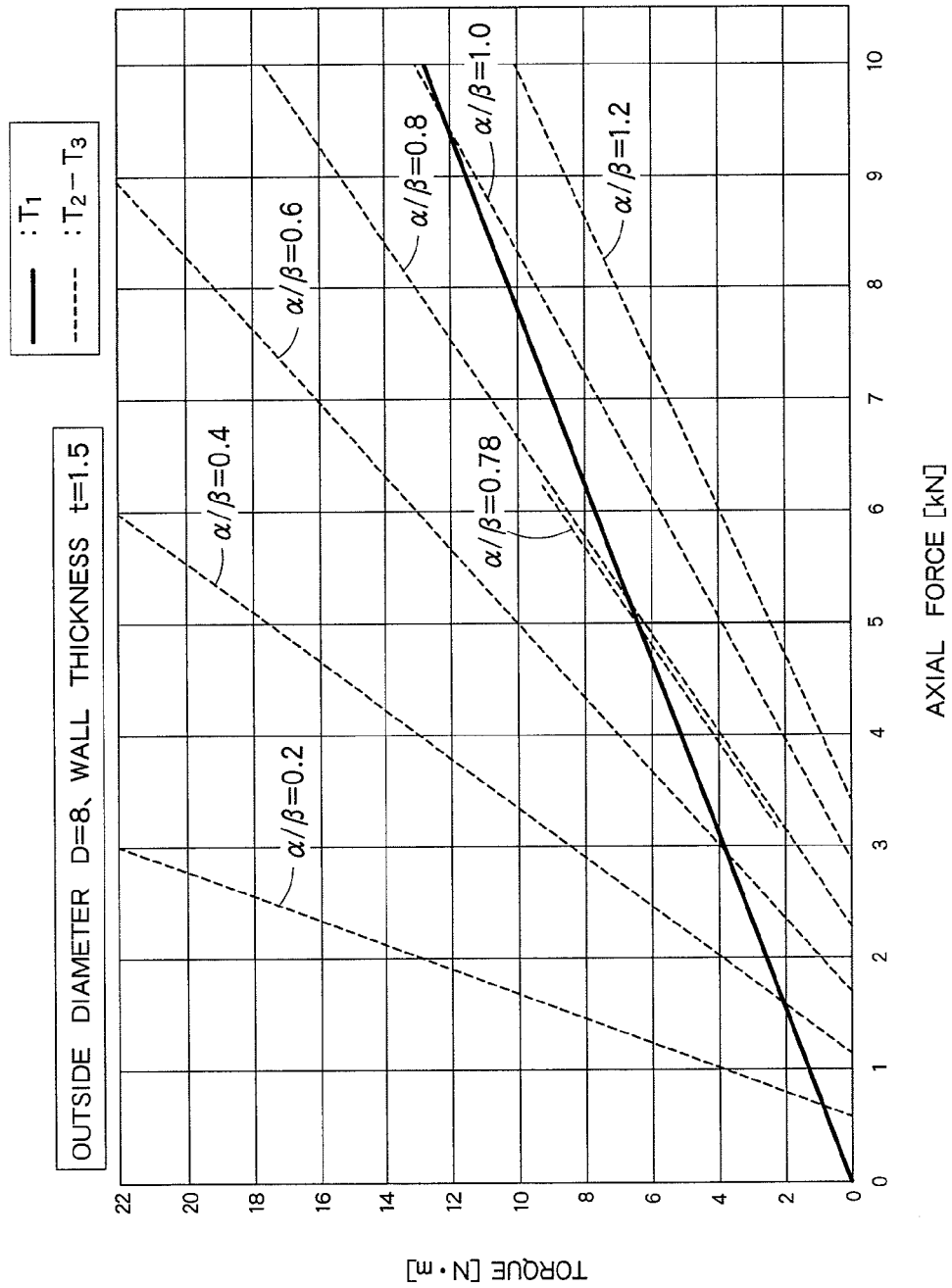
FIG. 4 is a graph showing results of the analysis of the relation between axial force and torque conducted to fined conditions for designing a pipe fastening structure that does not cause dragging a metal pipe having an outside diameter of 8.0 mm and a wall thickness of 1.5 mm.

In FIG. 4, the outside diameter D and the wall thickness t of the metal pipe 10 are 8 mm and 1.5 mm, respectively, the ratio $\alpha$ (=$D_2/D$) is fixed at 1, and the ratio $\beta$ (=$D_3/D$) is varied.

Frictional torque $T_1$ exerted on the first spherical part 20 to restrain the end member 16 from turning is calculated by substituting $\mu = 0.64$, the value of $\sin \theta_1$, $\alpha = 1$ and the value of D into the left side of Expression (2). In FIG. 4, the variation of the frictional torque $T_1$ with the axial force is indicated by a thick straight line.

Differences between the fastening torque $T_2$ and the torsional countertorque $T_3$, namely, $T_2 - T_3$, are calculated by substituting $\mu = 0.64$, and values of $\sin \theta_2$, the ratio and the outside diameter D into the first term of the right side of Expression (2) and substituting values of the outside diameter D and the ratio $\gamma$ (=$d/D$) and the maximum shearing stress $\tau_{max}$ of 62.35 MPa into the second term of the right side of Expression (2). In FIG. 4, the variation of $T_2 - T_3$ with axial force for values of $\alpha/\beta$ is indicated by straight broken lines.

It is considered that the axial force F exceeding 5 kN will not be applied to a pipe fastening structure consisting of stainless steel parts. In FIG. 4, values of the ratio $\alpha/\beta$ for the straight broken lines indicating the right side of Expression (2) and extending under the thick straight line indicating the left side of Expression (2) in a range of axial force not higher than 5 kN are obtained.

When the ratio $\beta$ is large relative to the ratio $\alpha$ ($\alpha/\beta = 0.2$, 0.3, 0.4 or 0.5), $T_2 - T_3$ is greater than the frictional torque $T_1$ in a range of the axial force F excluding a range of the axial force F in which the axial force F is very low and Expression (2) is not satisfied. This condition will be explained in connection with FIG. 2. When the diameter $D_3$ of the contact circle on the second spherical part 21 in contact with the sliding surface 25 is considerably greater than the diameter $D_2$ of the contact circle on the first spherical part 20 in contact with the sealing surface 27, the torque exerted on the end member 16 by the nut 12 is higher than the frictional countertorque exerted on the end member 16 by the sealing surface 27. Consequently, the end member 16 will be dragged for turning by the nut 12.

When $\alpha/\beta$ is 0.8 or 0.9, a range in which $T_2 - T_3$ is lower than the frictional torque $T_1$ and Expression (2) is satisfied is wide. This condition signifies that a countertorque produced by friction between the first spherical part 20 and the sealing surface 27 of the counterpart 14 is higher than the torque exerted by the nut 12 on the second spherical part 21 and working to turn the end member 16 and hence the end member 16 will not be dragged for turning by the nut 12 when the diameter $D_3$ of the contact circle on the second spherical part 21 in contact with the sliding surface 25 is greater to some extent than the diameter $D_2$ of the contact circle on the first spherical part 20 in contact with the sealing surface 27 of the counterpart 14.

When the metal pipe 10 has an outside diameter in the range of 8 to 10 mm and a wall thickness in the range of 1.0 to 1.5 mm, the fastening axial force F is, as mentioned above, on the order of 5 kN at the maximum. Normally, the axial force F is in the range of about 3 to about 4 kN. The value of the ratio $\alpha/\beta$ for the straight broken line indicating $T_2 - T_3$ and crossing the thick straight line indicating the frictional torque $T_1$ at an axial force F of 5 kN will be estimated by proportionally distributing the straight lines for $\alpha/\beta = 0.80$ and $\alpha/\beta = 0.60$ shown in FIG. 4. Thus, it is known that the end member 16 will not be practically dragged for turning by the nut 12 when $\alpha/\beta > 0.78$.

It is known from FIG. 4 that, the dragged turning of the end member 16 can be more surely prevented when the ratio $\alpha/\beta$ increases further beyond 1. A value of the ratio $\alpha/\beta$ greater than 1 signifies that the sphere defining the first spherical part 20 is larger than that defining the second spherical part 21. In some cases, a pipe fastening structure having a first spherical part 20 larger than a second spherical part 21 due to restrictive conditions of the counterpart 14. Therefore, the maximum value of the ratio α/β is 1, which signifies that the diameter $D_2$ of the contact circle on the first spherical part 20 in contact with the sealing surface 27 is equal to the diameter $D_3$ of the contact circle on the second spherical part 21 in contact with the sliding surface 25.

Figure 5:
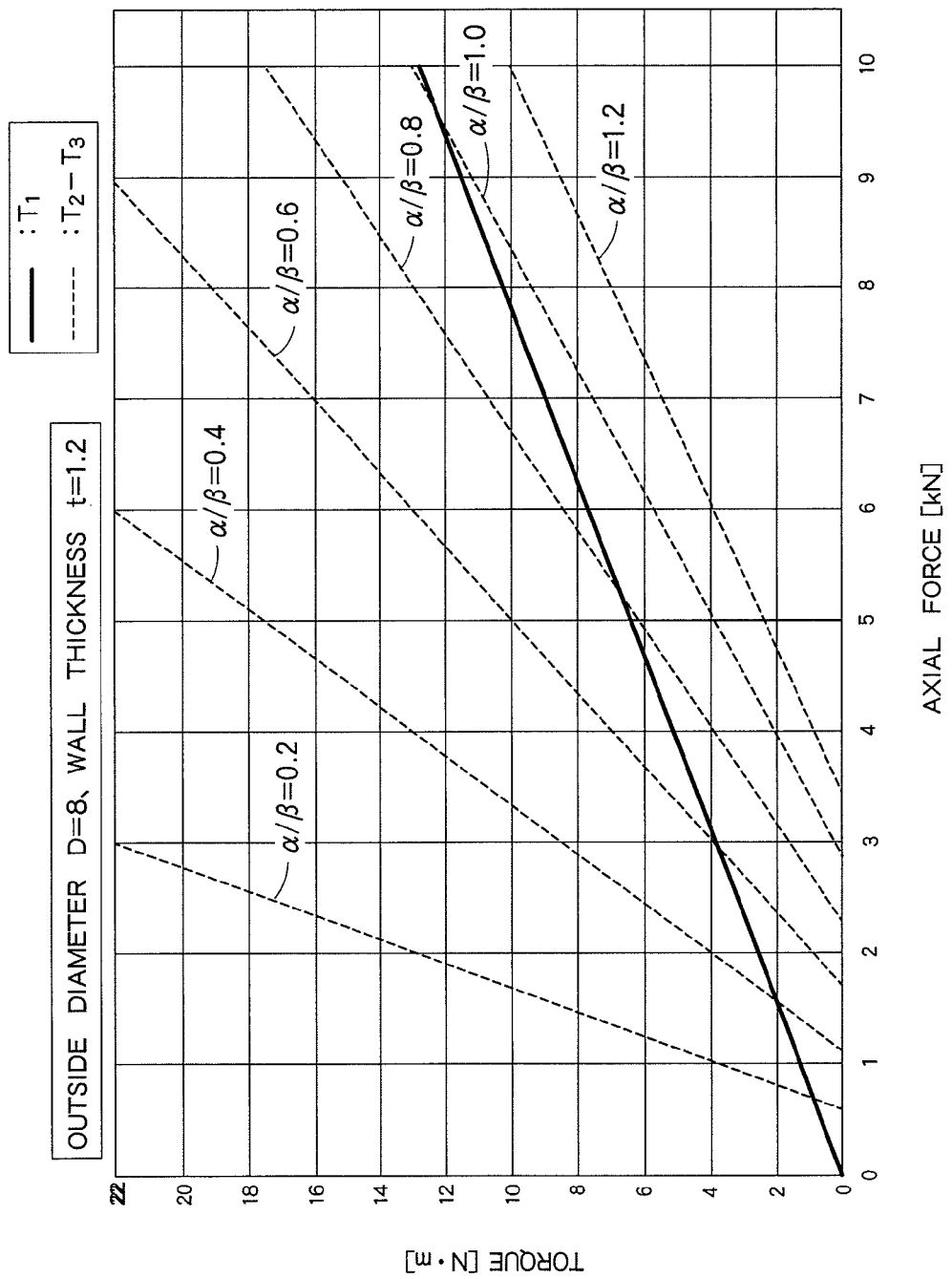
FIG. 5 is a graph showing results of the analysis of the relation between axial force and torque conducted to fined conditions for designing a pipe fastening structure that does not cause dragging a metal pipe having an outside diameter of 8.0 mm and a wall thickness of 1.2 mm.

The ratio α/β effective in preventing the metal pipe 10 from being dragged for turning when the metal pipe 10 has an outside diameter D of 8 mm and a wall thickness t of 1.2 mm determined from FIG. 5 by a procedure taken for determining the values of the ratio α/β from FIG. 4 is expressed by:

α/β≧0.80

Figure 6:
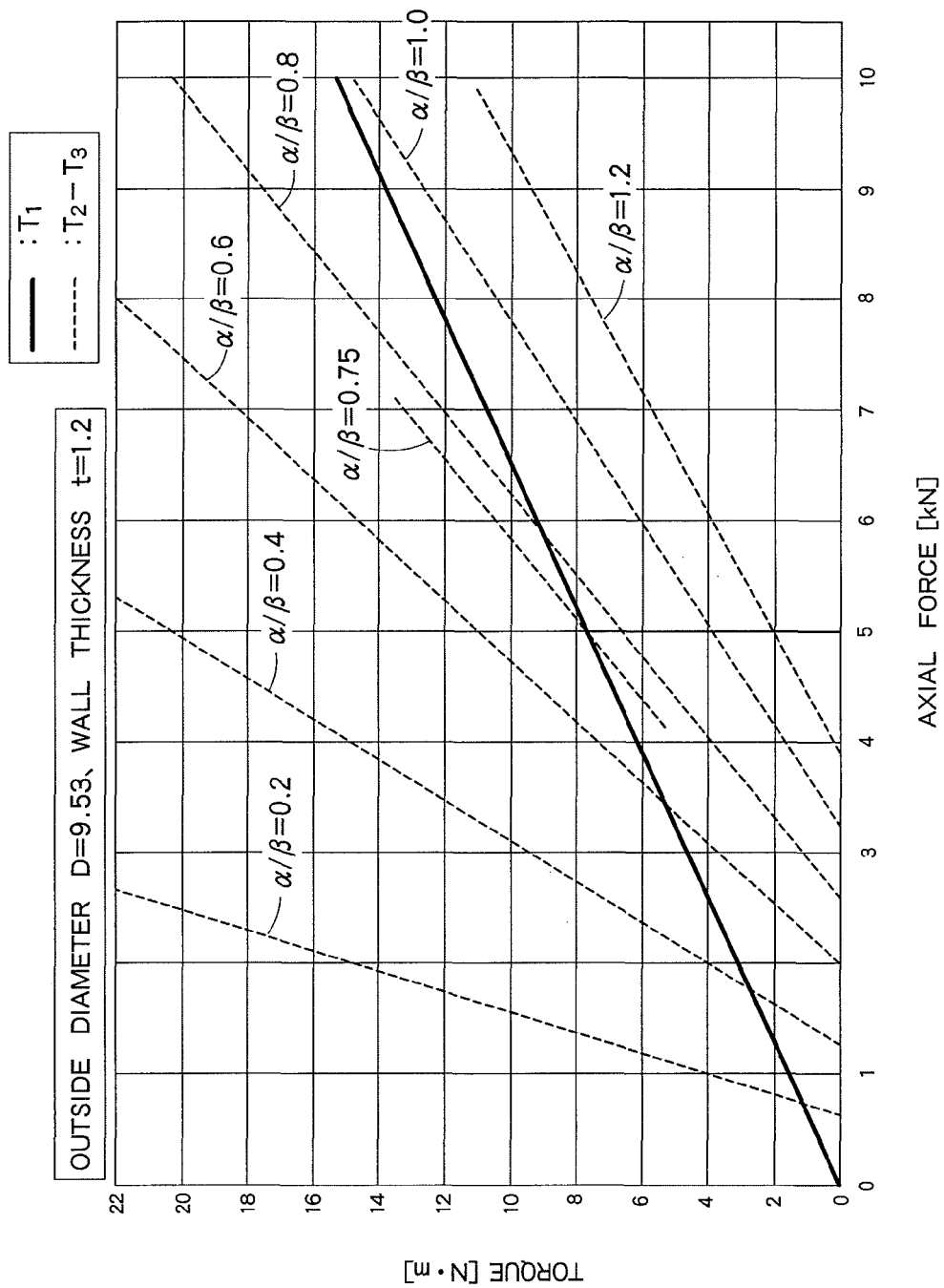
FIG. 6 is a graph showing results of the analysis of the relation between axial force and torque conducted to fined conditions for designing a pipe fastening structure that does not cause dragging a metal pipe having an outside diameter of 9.53 mm and a wall thickness of 1.2 mm.
Figure 7:
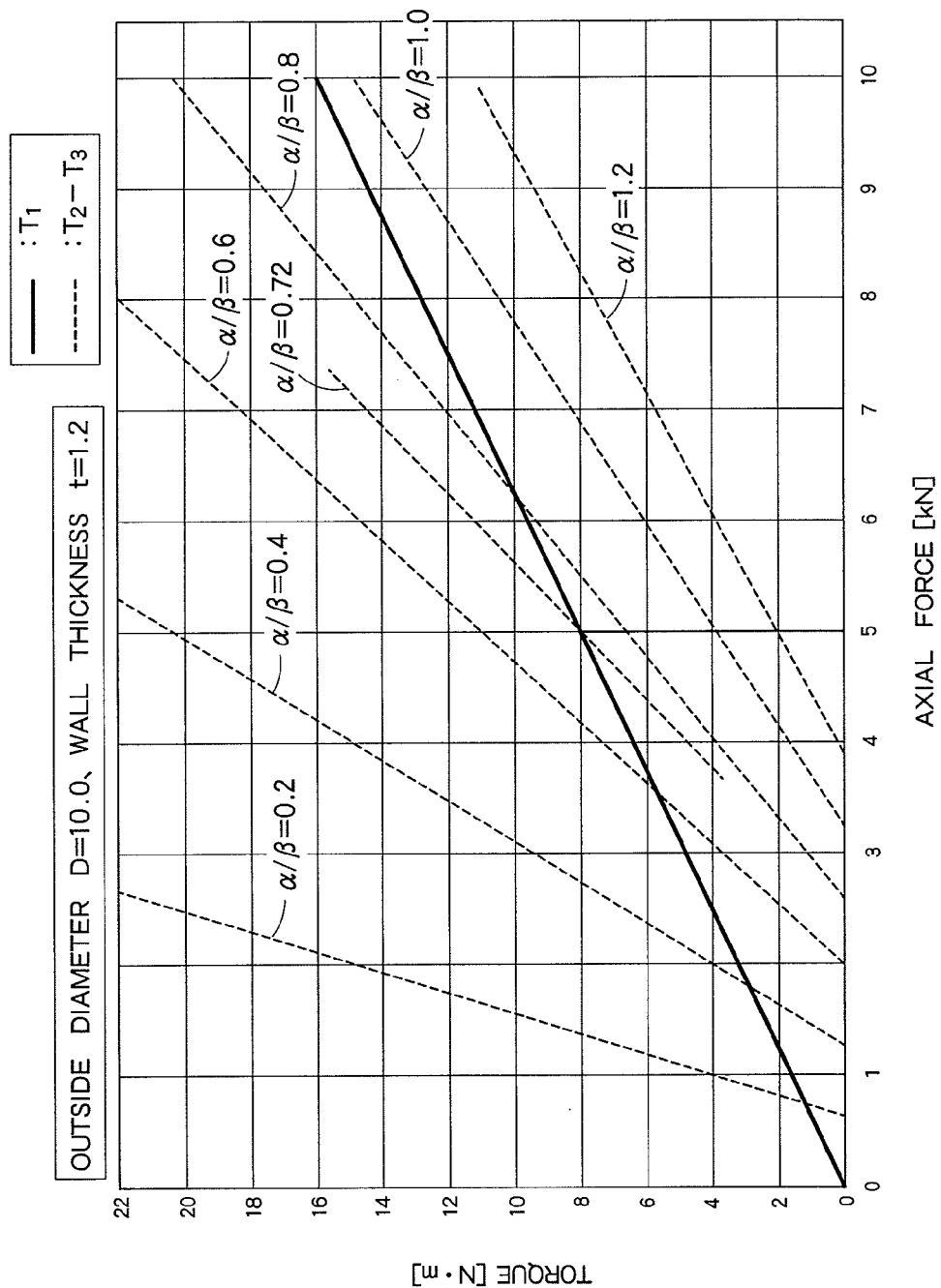
FIG. 7 is a graph showing results of the analysis of the relation between axial force and torque conducted to fined conditions for designing a pipe fastening structure that does not cause dragging a metal pipe having an outside diameter of 10.0 mm and a wall thickness of 1.2 mm.

Similarly, the ratio α/β effective in preventing the dragged turning of the metal pipe 10 when the metal pipe 10 has an outside diameter D of 9.53 mm and a wall thickness t of 1.2 mm determined from FIG. 6 is:

α/β≧0.75

When the metal pipe 10 has an outside diameter D of 10.00 mm and a wall thickness t of 1.2 mm, the ratio α/β is expressed by:

α/β≧0.72

From the foregoing conditions for the value of the ratio α/β, a range of values of the ratio α/β is expressed by:

1.0≧α/β0.80    (3)

Practically, the dragging of the end member 16 for turning by the nut 12 can be suppressed when the ratio α/β satisfies Expression (3).

Preferably, the hardness of the sliding surface 25 of the nut 12 is higher than that of the surface of the second spherical part 21 of the end member 16. When the sliding surface 25 of the nut 12 is harder than the surface of the second spherical part 21 and the nut 12 and the second spherical part 21 are in line contact with each other, the nut 12 will not be galled, the line contact between the nut 12 and the second spherical part 21 is maintained even if the contact surface of the second spherical part 21 is galled, and torque necessary for producing a desired axial force F does not increase. Thus, when the nut 12 and the second spherical part 21 are in line contact with each other, increase in the area of the surface of the second spherical part 21 in contact with the nut 12 resulting from the deformation of the sliding surface 25 can be prevented and the dragging of the end member 16 for turning by the nut 12 can be surely prevented.

Preferably, the sliding surface 25 or the surface of the second spherical part 21, and the surface of the first spherical part 20 are coated with oil to avoid seizing.

Second Embodiment

Figure 8:
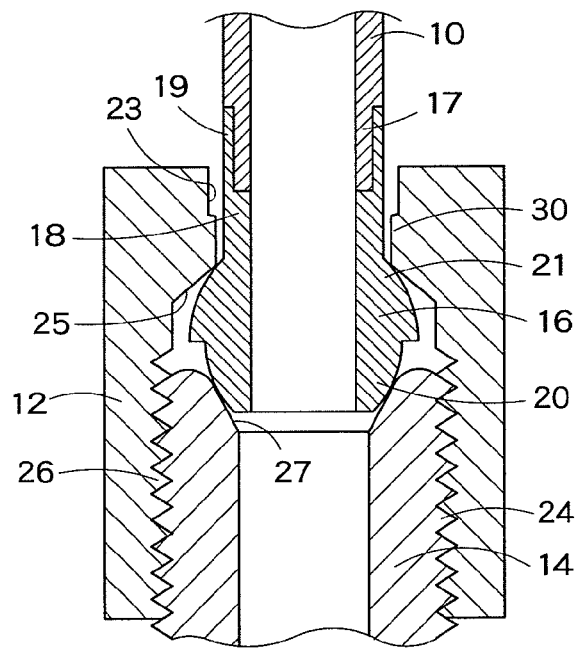
FIG. 8 is a longitudinal sectional view of a pipe fastening structure in a second embodiment according to the present invention.

FIG. 8 shows a pipe fastening structure in a second embodiment according to the present invention.

The second and third to sixth embodiments are similar to the first embodiment in that the ratio of the ratio α for determining the diameter $D_2$ of the contact circle on the first spherical part 20 in contact with the sealing surface 27 of the counterpart 14 to the ratio β for determining the diameter $D_3$ of a contact surface on the second spherical part 21 in contact with the sliding surface 25, namely, α/β, is supposed to meet an expression:

1.0≧α/β≧0.80

In the pipe fastening structure in the second embodiment, the diameter of a part of the inside surface of an outer part of a nut 12 is reduced to form a step portion 30. The step portion 30 is formed on the inside surface of the nut 12 defining a through hole 23 in the nut 12. The diameter of the through hole 23 at an end of the step portion 30 is decreased (or returned to normal size diameter normally formed) to merge with a sliding surface 25.

The step portion 30 brings a contact circle on a second spherical part 21 of an end member 16 into contact with the sliding surface 25 at a position near a neck 18. Consequently, the diameter $D_3$ of the contact circle on the second spherical part 21 is small and the ratio β is diminished and approaches the ratio α. Thus, the condition expressed by Expression (3) can be easily satisfied.

When the nut 12 is provided with the step portion 30, the end member 16 can be fastened to the counterpart 14 even if the neck 18 is tilted relative to the counterpart 14 or the metal pipe 10 is joined somewhat incorrectly to the neck 18.

Third Embodiment

Figure 9:
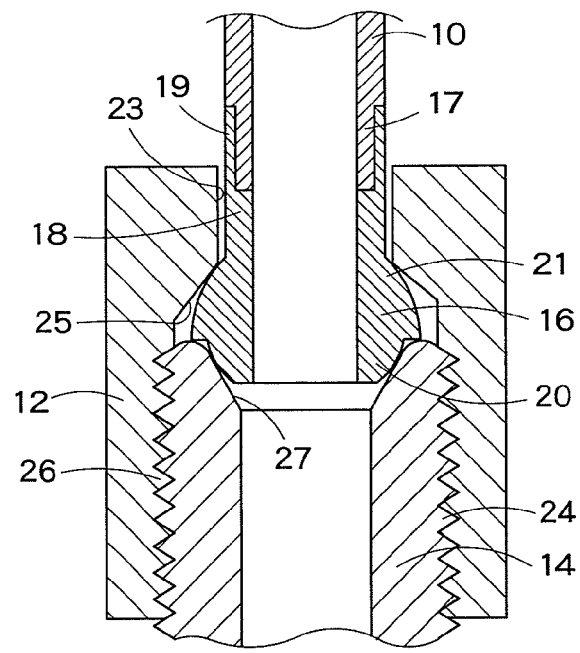
FIG. 9 is a longitudinal sectional view of a pipe fastening structure in a third embodiment according to the present invention.

FIG. 9 shows a pipe fastening structure in a third embodiment according to the present invention.

In the pipe fastening structure in the third embodiment, an end member 16 is provided with a shoulder 32 at the boundary between a first spherical part 20 and a second spherical part 21. The shoulder 32 is brought into contact with the end surface of a counterpart 14 continuous with a sealing surface 27 formed in the counterpart 14.

The shoulder 32 of the end member 16 is pressed against the end surface of the counterpart 14 when a nut 12 is fastened. Therefore, the end surface of the counterpart 14 exerts a countertorque on the end member 16. The countertorque enhances the certainty of meeting the condition expressed by Expression (2) and prevents the end member 16 from being dragged for turning by the nut 12 more surely.

Fourth Embodiment

Figure 10:
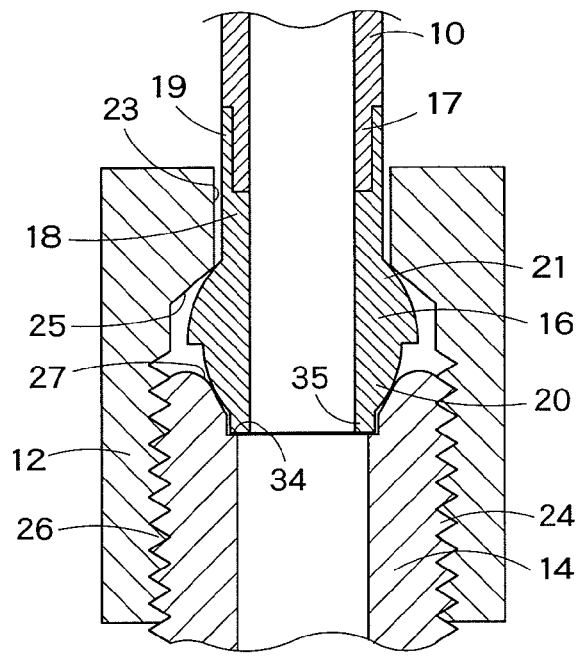
FIG. 10 is a longitudinal sectional view of a pipe fastening structure in a fourth embodiment according to the present invention.

FIG. 10 shows a pipe fastening structure in a fourth embodiment according to the present invention.

In the pipe fastening structure in the fourth embodiment, a second shoulder 34 is formed in a counterpart 14 between the inside surface of a bore formed in the counterpart 14 and a sealing surface 27 formed in an outer end of the counterpart 14. The end surface of a first spherical part 20 formed in an end member 16, namely, the end surface 35 of the end member 16, is brought into contact with the second shoulder 34. The second shoulder 34 is formed by cutting an inner end part of the sealing surface 27.

Since the end surface 35 of the end member 16 is pressed against the second shoulder 34 formed in the end part of the sealing surface 27, the end member 16 and the counterpart 14 are united together, so that damaging the sealing surface 27 can be avoided.

If a nut 12 is fastened excessively tightly, the first spherical part 20 is axially sunken into the sealing surface 27. Thus, the ratio α/β diminishes below 0.8 as the nut 12 is fastened tighter. Consequently, the end member 16 becomes more likely to be dragged for turning by the nut 12. However, the end surface 35 of the end member 16 in contact with the second shoulder 34 can prevent the end member 16 from being dragged for turning by the nut 12.

Fifth Embodiment

Figure 11:
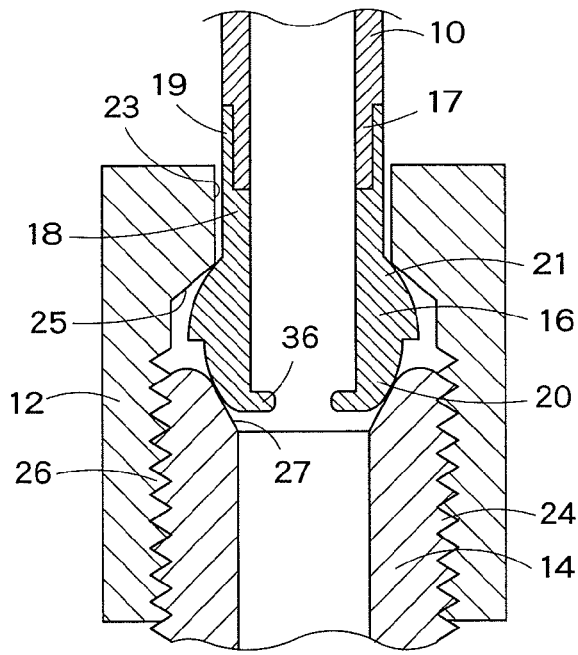
FIG. 11 is a longitudinal sectional view of a pipe fastening structure in a fifth embodiment according to the present invention.

FIG. 11 shows a pipe fastening structure in a fifth embodiment according to the present invention.

In the pipe fastening structure in the fifth embodiment, the inside surface of an end part of a first spherical part 20 of an end member 16 is bulged inward so as to form a thick end part 36 of an inside diameter smaller than that of the inside diameter of the first spherical part 20 by 10% to 80%.

When the first spherical part 20 is provided with the thick end part 36, the end part of the first spherical part 20 has a high rigidity and will not be deformed even if the first spherical part 20 is pressed against the sealing surface 27 of the counterpart 14 by a high axial force F of, for example, 5 kN.

Figure 12:
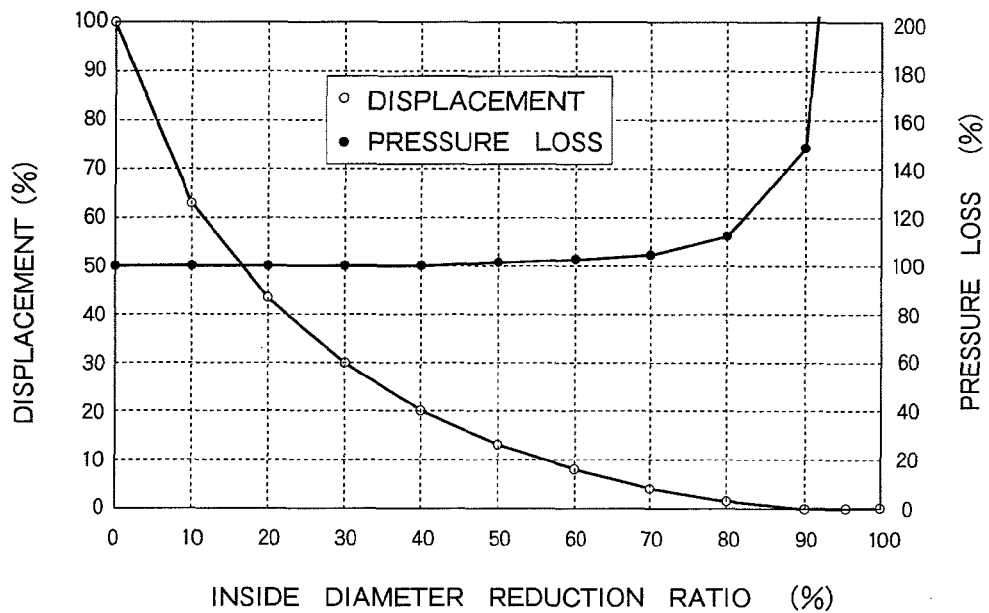
FIG. 12 is a graph showing the variation of pressure loss and displacement of an end with inside diameter reduction ratio dependent on the dimension of a thick end.

FIG. 12 is a graph showing the variation of pressure loss and axial displacement of the end member 16 when a nut 12 is fastened excessively tightly with inside diameter reduction ratio, in which inside diameter reduction ratio is measured on the horizontal axis.

The thick end part 36 formed in the end part of the end member 16 increases the rigidity of the end part of the end member 16. Therefore, the axial displacement of the end member 16 can be suppressed when the nut 12 is fastened excessively tightly. The thick end part 36 reduces sharply the inside diameter of the end member 16 equal to the inside diameter of the pipe 10 and functions as an orifice entailing pressure loss.

As obvious from FIG. 12, pressure loss tends to increase when the inside diameter reduction ratio increases beyond 60%.

Axial displacement is smaller when the inside diameter reduction ratio is higher. As mentioned above, increase in the inside diameter reduction ratio causes pressure loss to increase. Therefore, it is preferable, from the viewpoint of the enhancement of the rigidity only for the suppression of displacement, that the inside diameter reduction ratio is in the range of 10% to 60%.

Sixth Embodiment

Figure 13:
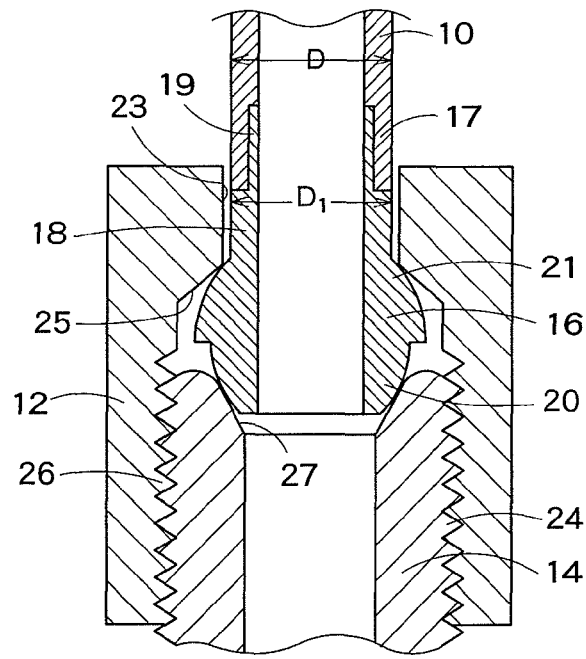
FIG. 13 is a longitudinal sectional view of a pipe fastening structure in a sixth embodiment according to the present invention.
Figure 16:
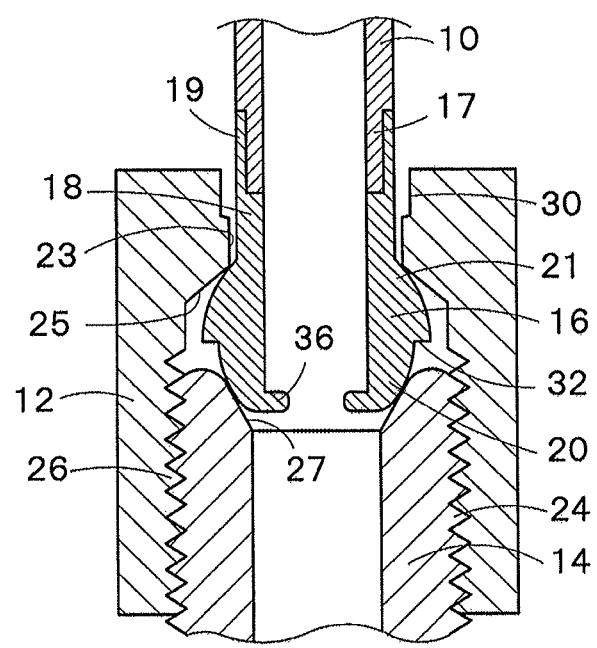
FIG. 16 is a longitudinal sectional view of a pipe fastening structure according to another embodiment of the present invention.

FIG. 13 shows a pipe fastening structure in a sixth embodiment according to the present invention.

In the pipe fastening structure in the sixth embodiment, the joint of an end member 16 and a metal pipe 10 is different from that shown in FIG. 1.

The end member 16 has a neck 18 having a joining part 19 fitted in a joining part 17 of the metal pipe 10. The outside diameter $D_1$ of the neck 18, similarly to that of the neck 18 of the first embodiment, is equal to the outside diameter D of the pipe 10 or substantially equal to the outside diameter D of the metal tube 10 with an error within a tolerance.

Preferably, the outside surface of the joining part 17 of the metal pipe 10 is flush with that of the end member 16.

When the outside diameter $D_1$ of the neck 18 of the end member 16 is substantially equal to the outside diameter D of the metal pipe 10, the end member 16 can be easily formed such that the ratios α and β satisfy Expression (3).

What is claimed is:

1. A pipe fastening structure used in high-pressure fuel lines comprising:
   an end member attached to an end part of a metal pipe;
   a nut for fastening the end part of the metal pipe; and
   a counterpart to which the end part of the metal pipe is fastened by the nut;
   wherein the end member has a first spherical part to be brought into contact with a sealing surface formed in the counterpart, a second spherical part formed integrally with the first spherical part so as to be in contact with a sliding surface formed in the nut, and a neck continuous with the second spherical part and having the shape of the metal pipe, an outside diameter $D_1$ of the neck is approximately equal to an outside diameter D of the metal pipe, respective centers of spheres respectively defining the first and the second spherical parts are on an axis of the neck, and the ratio α/β, where α=$D_2$/D, β=$D_3$/D, D is the outside diameter of the metal pipe, $D_2$ is a diameter of a contact circle on the first spherical part in contact with the sealing surface and $D_3$ is a diameter of a contact circle on the second spherical part in contact with the sliding surface of the nut, meets an expression:

$$1.0 \geq \alpha/\beta \geq 0.80,$$

such that the end member and the nut do not turn together relative to the counterpart when torque is applied to the nut so that damage to the sealing surface and the sliding surface is prevented; and
   a step portion is formed in an inside portion of the nut near a tail end of the nut where the neck is located, wherein the step portion makes a portion of an inner diameter of the nut smaller, and wherein the step portion is adjacent to the neck.

2. The pipe fastening structure according to claim 1, wherein the boundary between the first spherical part and the second spherical part is a flat shoulder that is flush with an end surface of the counterpart, the end surface of the counterpart being continuous with the sealing surface of the counterpart.

3. The pipe fastening structure according to claim 1, wherein a second shoulder is formed in the counterpart between an inside surface of a bore formed in the counterpart and the sealing surface of the counterpart, and wherein
   the first spherical part has an extension forming an end surface that is flush with the second shoulder.

4. The pipe fastening structure according to claim 1, wherein an inside surface of an end part of the first spherical part has a thick end part that extends towards the center of a bore formed inside the first spherical part, the thick end part is continuous with a surface of the first spherical part that contacts the sealing surface of the counterpart and creates a flange perpendicular to the inside diameter of the end member.

5. The pipe fastening structure according to claim 1, wherein an end part of the neck is welded or brazed to an end part of the metal pipe, and an outside surface of the neck of the end member attached to the metal pipe is flush with an outside surface of the metal pipe.

6. The pipe fastening structure according to claim 1, wherein the metal pipe, the nut and the counterpart are made of stainless steels, respectively.

7. The pipe fastening structure according to claim 1, wherein the sliding surface of the nut has a hardness higher than that of the surface of the second spherical part.

8. The pipe fastening structure according to claim 1, wherein the sliding surface of the nut and the sealing surface of the counterpart are coated with oil.

9. The pipe fastening structure according to claim 1, wherein respective centers of spheres respectively defining the first and the second spherical parts are at the same point on the axis of the neck.

10. The pipe fastening structure according to claim 1, wherein a diameter of a sphere defining the first spherical part is smaller than that of a sphere defining the second spherical part.

11. The pipe fastening structure according to claim 1, wherein the metal pipe and the end member are joined such that a joining part of the metal pipe and a joining part of the end member overlap each other, the joining part of the metal pipe is fitted in the joining part of the end member, the outside surface of the metal pipe is flush with the outside surface of the joining, part of the end member, and the inside surface of the joining part of the metal pipe is flush with the inside surface of the end member.

12. The pipe fastening structure according to claim 1, wherein the metal pipe and the end member are joined such that a joining part of the metal pipe and a joining part of the end member overlap each other, the joining part of the end member is fitted in the joining part of the metal pipe, the outside surface of the joining part of the metal pipe is flush with the outside surface of the end member, and the inside surface of the metal pipe is flush with the inside surface of the joining part of the end member.

13. A pipe fastening structure used in high-pressure fuel lines comprising:
   an end member attached to an end part of a metal pipe;
   a nut for fastening the end part of the metal pipe; and
   a counterpart to which the end part of the metal pipe is fastened by the nut;
   wherein the end member has a first spherical part to be brought into contact with a sealing surface formed in the counterpart, a second spherical part formed integrally with the first spherical part so as to be in contact with a sliding surface formed in the nut, and a neck continuous with the second spherical part and having the shape of the metal pipe, an outside diameter $D_1$ of the neck is approximately equal to an outside diameter D of the metal pipe, respective centers of spheres respectively defining the first and the second spherical parts are on an axis of the neck, and the ratio $\alpha/\beta$, where $\alpha=D_2/D$, $\beta=D_3/D$, D is the outside diameter of the metal pipe, $D_2$ is a diameter of a contact circle on the first, spherical part in contact with the sealing surface and $D_3$ is a diameter of a contact circle on the second spherical part in contact with the sliding surface of the nut, meets an expression:

$1.0 \geq \alpha/\beta \geq 0.80$, such that the end member and the nut do not turn together relative to the counterpart when torque is applied to the nut so that damage to the sealing surface and the sliding surface is prevented; and
   wherein the boundary between the first spherical part and the second spherical part is a flat shoulder that is flush with an end surface of the counterpart, the end surface of the counterpart being continuous with the sealing surface of the counterpart.

14. A pipe fastening structure used in high-pressure fuel lines comprising:
   an end member attached to an end part of a metal pipe;
   a nut for fastening the end part of the metal pipe; and
   a counterpart to which the end part of the metal pipe is fastened by the nut;
   wherein the end member has a first spherical part to be brought into contact with a sealing surface formed in the counterpart, a second spherical part formed integrally with the first spherical part so as to be in contact with a sliding surface formed in the nut, and a neck continuous with the second spherical part and having the shape of the metal pipe, an outside diameter $D_1$ of the neck is approximately equal to an outside diameter D of the metal pipe, respective centers of spheres respectively defining the first and the second spherical parts are on an axis of the neck, and the ratio $\alpha/\beta$, where $\alpha=D_2/D$, $\beta=D_3/D$, D is the outside diameter of the metal pipe, $D_2$ is a diameter of a contact circle on the first spherical part in contact with the sealing surface and $D_3$ is a diameter of a contact circle on the second spherical part in contact with the sliding surface of the nut, meets an expression:

$1.0 \geq \alpha/\beta \geq 0.80$, such that the end member and the nut do not turn together relative to the counterpart when torque is applied to the nut so that damage to the sealing surface and the sliding surface is prevented; and
   wherein an inside surface of an end part of the first spherical part has a thick end part that extends towards the center of a bore formed inside the first spherical part, the thick end part is continuous with a surface of the first spherical part that contacts the sealing surface of the counterpart and creates a flange perpendicular to the inside diameter of the end member.

* * * * *